United States Patent [19]
Griffis

[11] Patent Number: 4,964,899
[45] Date of Patent: Oct. 23, 1990

[54] APPARATUS FOR TRANSPORTING A PERSON FROM A CONTAMINATED AREA TO A DECONTAMINATION FACILITY

[76] Inventor: Steven C. Griffis, 2929 Avenue D, Council Bluffs, Iowa 51501

[21] Appl. No.: 188,843

[22] Filed: May 2, 1988

[51] Int. Cl.⁵ .......................................... B01D 46/10
[52] U.S. Cl. ..................................... 55/356; 55/385.1
[58] Field of Search ............. 55/356, 385 A, DIG. 29

[56] References Cited

U.S. PATENT DOCUMENTS

| | | | |
|---|---|---|---|
| 1,585,358 | 5/1926 | Arkwright | 55/356 X |
| 2,172,944 | 9/1939 | Norris | 55/DIG. 29 |
| 3,158,457 | 11/1964 | Whitfield | 55/385 A X |
| 3,766,844 | 10/1973 | Donnelly et al. | 55/385 A X |
| 3,777,736 | 12/1973 | Van Der Waaij et al. | 55/DIG. 29 |
| 3,841,324 | 10/1974 | Kruiswijk | 55/356 X |
| 4,202,676 | 5/1980 | Pelosi, Jr. et al. | 55/502 X |
| 4,216,003 | 8/1980 | Diachuk | 55/502 X |
| 4,304,224 | 12/1981 | Fortney | 55/385 A X |
| 4,556,046 | 12/1985 | Riffel et al. | 55/356 X |
| 4,604,111 | 8/1986 | Natale | 55/385 A X |
| 4,682,448 | 7/1987 | Healey | 55/385 A X |
| 4,732,592 | 3/1988 | Spengler | 55/356 |
| 4,765,352 | 8/1988 | Strieter | 55/385 A X |

Primary Examiner—Robert Spitzer
Attorney, Agent, or Firm—Zarley, McKee, Thomte, Voorhees & Sease

[57] ABSTRACT

A wheeled enclosure provided for transporting a person from a contaminated area to a decontamination facility. The enclosure has a side door to permit the contaminated person to enter the interior thereof and to exit therefrom. The enclosure also has a door provided in the top portion thereof to permit the contaminated person to enter the interior of the enclosure. A filtered air intake is also provided for the enclosure.

3 Claims, 3 Drawing Sheets

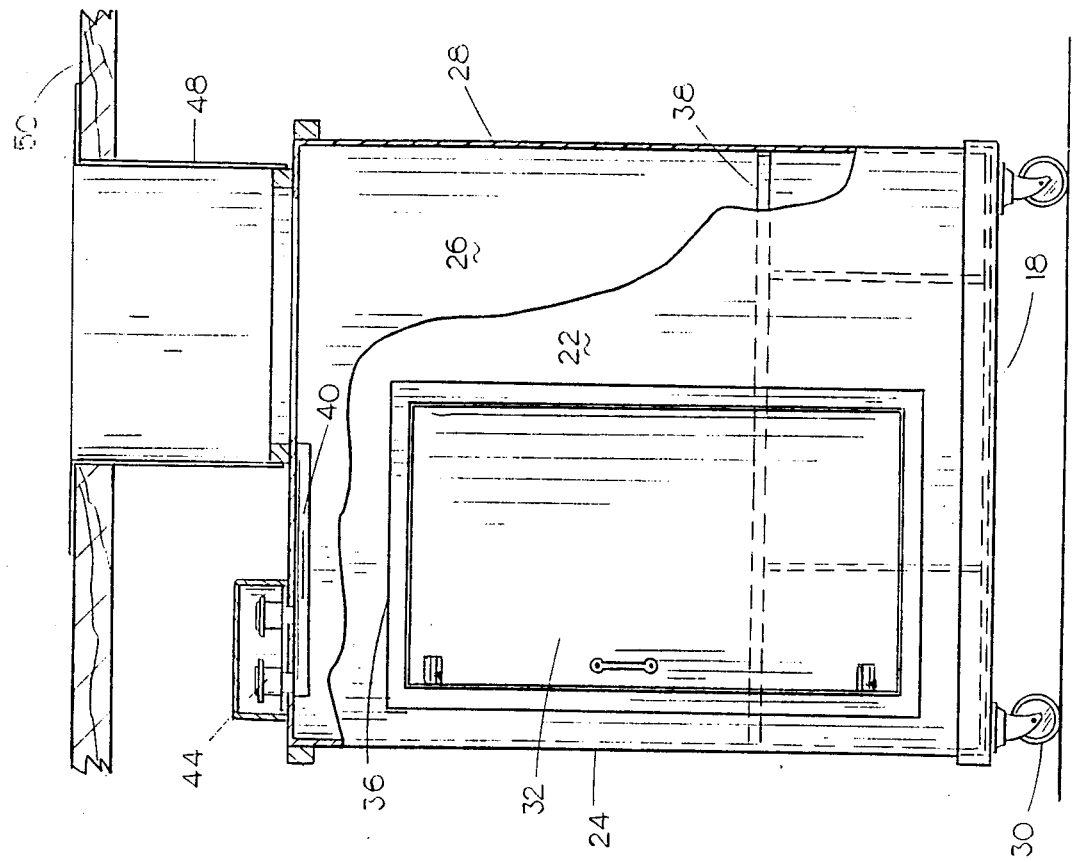
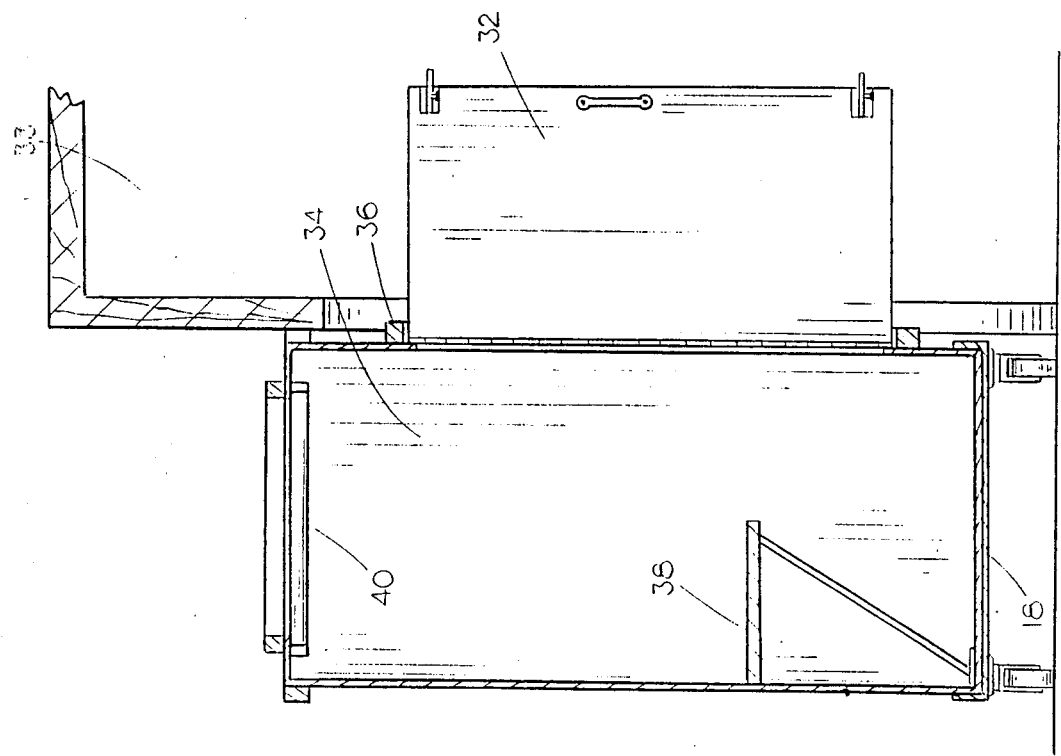

APPARATUS FOR TRANSPORTING A PERSON FROM A CONTAMINATED AREA TO A DECONTAMINATION FACILITY

BACKGROUND OF THE INVENTION

In the early 1940's, asbestos was an inexpensive material which was used in virtually every industrial plant across the nation because of its superior capabilities of noise reduction, insulating and fire retardant qualities. Asbestos was used in cement asbestos pipe, plaster, wiring, pipe insulation, sound absorbing tiles, floor tiles and sprayed on ceiling structural steel and deck pans.

Asbestos has been found to be a health hazard and asbestos removal or abatement programs are being conducted to remove these health hazards. Many regulations have been adopted and are in place to ensure the safety of those workers who are removing the asbestos as well as to ensure that the asbestos being removed will not be introduced into the surrounding atmosphere. For example, U.S. Pat. No. 4,604,111 describes a fairly common system which is employed in an asbestos removal project. In most projects, an enclosure is created around the space in which the asbestos is to be removed. The space is sealed by means of plastic sheets or the like. An air inlet is provided for the enclosed space to permit air to be drawn thereinto. A filtration unit such as the Model MT-3 of Micro-Trap, Inc. of Maple Shade, N.J. or the Model ST2000 of Global Consumer Services, Inc. of Los Angeles, Calif. is employed with each of the units having an air inlet and an air outlet. The air outlet of the filtration unit is placed in communication with the area outside of the enclosed space. A blower means is provided in the filtration unit so that the contaminated air in the enclosed space will be drawn through the filtration unit with the asbestos fibers being collected in the filtration unit. The filtration units are sometimes referred to as negative air systems so that air is drawn through the air inlet formed in the wall means and through the filtration unit.

In a majority of the situations where asbestos is being removed from an enclosed contaminated area, a decontamination facility is immediately adjacent the contaminated area so that a person exiting from the contaminated area will pass into an equipment room where the contaminated clothing is removed. The worker will then go into the shower room, shower and will then don clean clothing and will exit via the clean room. However, in some situations, it is not possible to provide the decontamination facility immediately adjacent the location where the abatement action is being conducted. For example, asbestos is sometimes removed from stairwells or the like and it is not possible to provide a shower room or the like immediately adjacent the stairwell. The present procedure is for the worker to be vacuumed prior to leaving the stairwell and then proceed directly to a decontamination facility or a shower. As the worker moves from the contaminated area to the decontamination facility, it is quite possible that asbestos fibers will fall from the contaminated clothing into the air through which the worker is passing.

It is therefore a principal object of the invention to provide an apparatus for transporting a person from a contaminated area to a decontamination facility.

More specifically, it is an object of the invention to provide a mobile enclosure means which may be used to transport the contaminated person from the contaminated area to a decontamination facility with a minimum of asbestos fibers being passed into the area between the contaminated area and a decontamination facility.

Still another object of the invention is to provide an apparatus for transporting a person from a contaminated area to a decontamination facility including side and upper doors.

Still another object of the invention is to provide a device of the type described which includes an air inlet having a filter means provided thereon to prevent the escape of contaminated material from the interior of the enclosure.

These and other objects will be apparent to those skilled in the art.

BRIEF DESCRIPTION OF THE DRAWINGS

FIG. 4 is a side sectional view illustrating the manner in which the apparatus of this invention may be positioned adjacent the door of the contaminated area or the door of the decontamination facility; and FIG. 5 is a partial side view illustrating the manner in which the apparatus may be used wherein the worker may enter the interior of the apparatus from the upper end thereof.

SUMMARY OF THE INVENTION

The apparatus for transporting a person from a contaminated area to a decontamination facility comprises a mobile enclosure means having a side door and an upper door provided thereon. It is desired to transport the contaminated person from a contaminated area to the decontamination facility, the enclosure is rolled to a position adjacent the door of the contaminated area. The side door is then opened into the contaminated area to permit the worker to enter the interior of the enclosure. After entering the enclosure, the side door is shut and the enclosure is rolled to a decontamination facility such as a shower or the like. Upon arriving at the shower, the worker exits into the shower through the side door.

A door is also provided at the top of the enclosure to permit a worker to enter the interior of the enclosure from above the enclosure should the worker be working in a ceiling area or the like. A filtered air inlet is provided on the top of the enclosure.

DESCRIPTION OF THE PREFERRED EMBODIMENT

Figure 1:
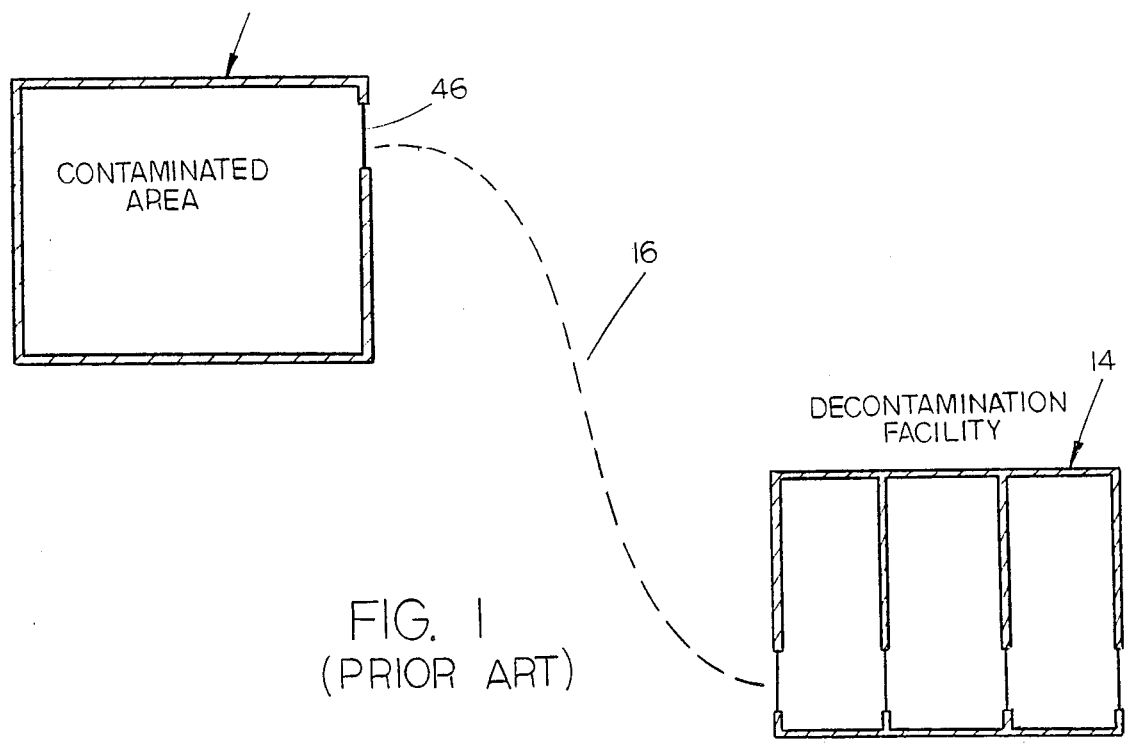
FIG. 1 is a schematic view illustrating the path which a person would normally have to travel from a contaminated area to a remote decontamination facility.

The apparatus of this invention is referred to generally by the reference numeral 10 and is designed to transport a person from a contaminated area 12 to a decontamination facility 14. FIG. 1 illustrates the normal method which would be employed for a worker to travel from the contaminated area 12, through occupied area 16 to the decontamination facility 14. Normally, a vacuum cleaner would be used on the worker's clothing to remove as much of the asbestos material as possible prior to the worker walking to the decontamination facility 14. Even though the worker's clothing has been vacuumed, a certain amount of the asbestos fibers will remain on the worker's clothing and will possibly fall therefrom as the worker is walking from the contaminated area 12 to the decontamination facility 14. It is to avoid the shortcomings of the conventional method that the apparatus of this invention has been designed. Apparatus 10 is a mobile enclosure means or housing having a bottom 18, top 20, and side walls 22, 24, 26 and 28 extending therebetween. A plurality of caster wheels 30 provided on the bottom 18 to enable the enclosure to be freely wheeled or pushed from one location to another.

Enclosure 10 is provided with a door 32 mounted in side wall 22 which is adapted to swing outwardly so that access may be gained to the interior 34 of the enclosure. An abutment means 36 protrudes outwardly from side wall 22 around door 32 the purpose of which will be described in more detail hereinafter. As seen in the drawings, a bench 38 is provided in interior 34 for the comfort of the worker.

The enclosure 10 is also provided with a door 40 formed in top 20 which is adapted to slide horizontally to expose the interior of the enclosure to permit a worker to enter the interior of the enclosure from above the enclosure as will also be described in more detail hereinafter. An upstanding member 42 extends upwardly from top 20 around door 40 as seen in the drawings. Top 20 is also provided with a filtered air intake referred to generally by the reference numeral 44 which is adapted to permit air to enter the interior of the enclosure but which is adapted to prevent the escape of asbestos fibers from the interior of the enclosure.

Figure 2:
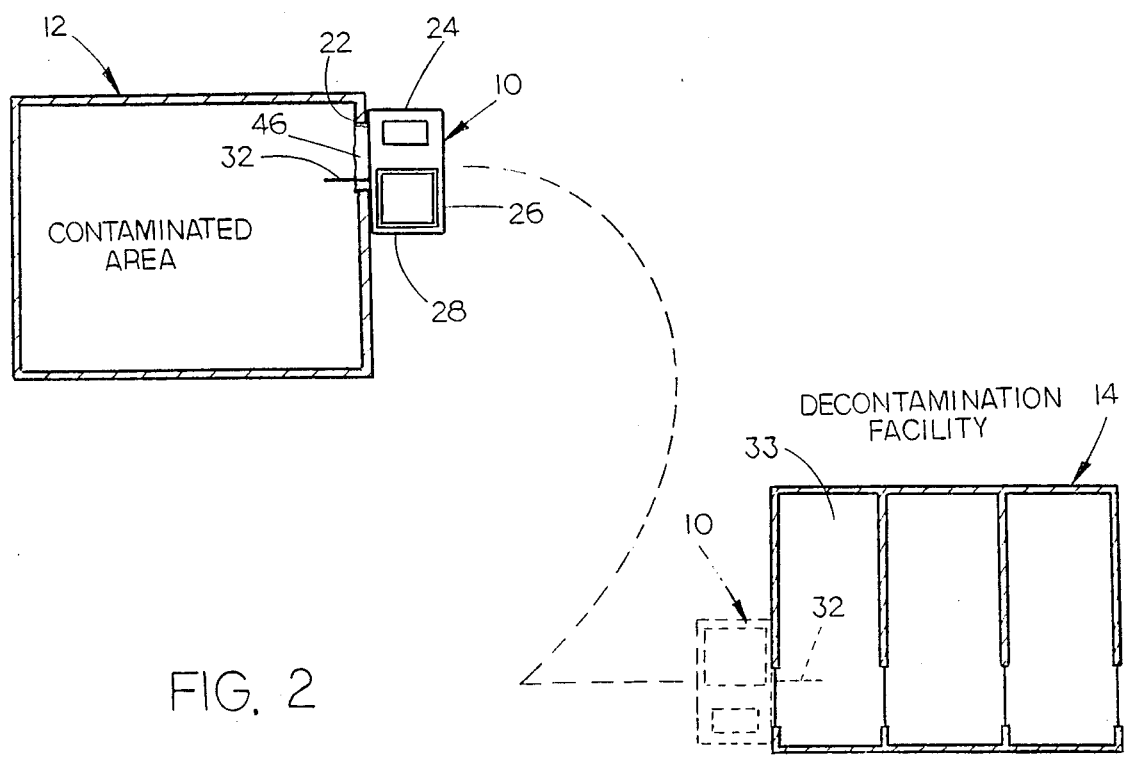
FIG. 2 is a schematic view illustrating the manner in which the apparatus of this invention is used to transport a person from a contaminated area to a decontamination facility.
Figure 3:
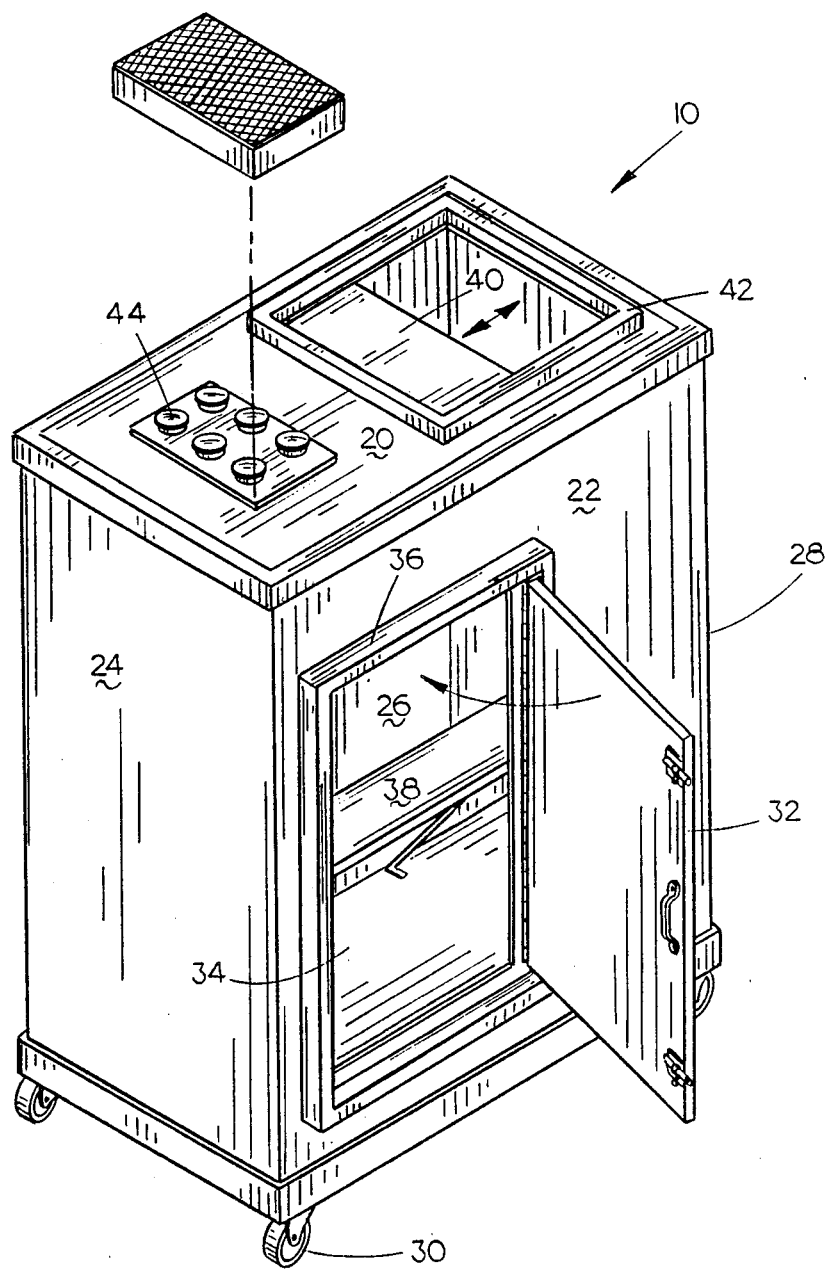
FIG. 3 is a perspective view of the apparatus of this invention.

When it is desired to transport a worker from the contaminated area 12 to the decontamination area 14, the enclosure means 10 is moved up to the contaminated area 12 so that the door 32 registers with the door 46 of contaminated area 12. In most situations, the door 46 will be a flexible sheet of plastic material or the like hanging in the door opening. When the enclosure is positioned as illustrated in FIG. 2, door 32 is opened so that the door 32 deflects or moves the door 46 aside. The worker then exits the contaminated area 12 and enters the interior of the enclosure and closes the door 32 behind him. The enclosure is then wheeled or rolled to the decontamination facility 14 with the door 32 being positioned adjacent the door of the equipment room or shower room 33 as the case may be. The abutment 36 is normally received in the door opening of the equipment room or shower room and the door 32 is then opened to permit the worker to exit the interior of the enclosure and enter the equipment room or the shower room as the case may be. Thus, it can be seen that the enclosure means 10 permits a worker having contaminated clothing to be transported through an occupied area or an area in which abatement procedure is not being conducted without the threat of asbestos fibers being disseminated in the noncontaminated area.

The top door 40 also has utility in those situations where a worker is working in ceiling area such as illustrated in FIG. 5. Normally, if the area being abated is rather small, a flexible plastic tube or sleeve 48 will extend downwardly through an opening in the ceiling 50 so that contaminated materials may be collected at the lower end of a tube 48. In those situations, the enclosure is rolled to a location beneath the tube 48 to enable the worker to enter the interior of the enclosure through the door 40. Once inside the enclosure, door 40 would be closed and the enclosure would be transported to the decontamination facility.

Thus, it can be seen that a novel apparatus has been provided which accomplishes at least all of its stated objectives.

I claim:

1. An apparatus for transporting a person from an asbestos-contaminated area to a decontamination facility comprising, an upstanding enclosure means comprising a bottom, a top, wall means extending between said top and said bottom, and an interior adapted to accommodate at least one person, said wall means having at least one selectively closable and sealable door means provided therein to permit a person to enter said interior of said enclosure means and to exit therefrom, and to maintain asbestos contaminants within said enclosure while closed, a protruding abutment means extending outwardly from said side wall means around said door means, to provide sealable connection with a contaminated area or a decontamination facility, an air inlet and filtering means mounted in said enclosure means to allow the entrance and exit of air to the interior thereof, and adapted to prevent the passage of contaminated asbestos materials from the interior of said enclosure means, and a wheel means on said bottom to permit said enclosure means to be moved from the contaminated area to the decontamination facility.

2. The apparatus of claim 1 wherein said top of said enclosure means also has a selectively, closable and sealable door means provided therein to permit a person to enter the interior of said enclosure means and adapted to prevent the escape of asbestos fibers when closed.

3. The apparatus of claim 1 wherein a bench means is provided in the interior of said enclosure means.

* * * * *